US009933590B2

(12) United States Patent
Kobayashi

(10) Patent No.: US 9,933,590 B2
(45) Date of Patent: Apr. 3, 2018

(54) CAMERA FILTER FRAME AND CAMERA FILTER UNIT

(71) Applicant: KABUSHIKI KAISHA TSUSO, Nagano (JP)

(72) Inventor: Hideo Kobayashi, Nagano (JP)

(73) Assignee: KABUSHIKI KAISHA TSUSO, Nagano (JP)

( * ) Notice: Subject to any disclaimer, the term of this patent is extended or adjusted under 35 U.S.C. 154(b) by 0 days.

(21) Appl. No.: 15/531,682

(22) PCT Filed: Jan. 6, 2016

(86) PCT No.: PCT/JP2016/050207
§ 371 (c)(1),
(2) Date: May 30, 2017

(87) PCT Pub. No.: WO2016/121427
PCT Pub. Date: Aug. 4, 2016

(65) Prior Publication Data
US 2017/0336591 A1    Nov. 23, 2017

(30) Foreign Application Priority Data

Jan. 27, 2015   (WO) .................. PCT/JP2015/052231

(51) Int. Cl.
*G03B 17/12* (2006.01)
*G02B 7/00* (2006.01)
(Continued)

(52) U.S. Cl.
CPC .............. *G02B 7/006* (2013.01); *G03B 11/00* (2013.01); *G03B 11/04* (2013.01); *G03B 17/06* (2013.01); *G03B 17/12* (2013.01); *G03B 17/56* (2013.01)

(58) Field of Classification Search
CPC ....................................................... G03B 17/12
(Continued)

(56) References Cited

U.S. PATENT DOCUMENTS 8,014,666 B2 * 9/2011 Neiman ................. G03B 17/00
  348/342
8,238,742 B2 * 8/2012 Neiman ................. G03B 17/00
  396/544
(Continued)

FOREIGN PATENT DOCUMENTS

CN     203037971 U     7/2013
CN     103246037 A     8/2013
(Continued)

OTHER PUBLICATIONS

International Search Report for PCT/JP2016/050207, dated Mar. 8, 2016.
(Continued)

*Primary Examiner* — Clayton E LaBalle
*Assistant Examiner* — Kevin Butler

(57) ABSTRACT

A camera filter unit (10) includes a front ring (4) for holding a polarization filter (2) and a rear ring (5) for rotatably holding the front ring (4). The front ring (4) includes a rear annular wall portion (18) extending in a radial direction (R), a rear annular plate portion (19) extending rearward from the inner peripheral end of the rear annular wall portion (18), and an annular projection portion (20) projecting for a short distance from the rear end of the rear annular plate portion (19) toward the outer peripheral side. The rear annular wall portion (18), the rear annular plate portion (19), and the annular projection portion (20) form an annular recess (21) on the outer peripheral surface of the front ring (4). The rear ring (5) includes an annular protrusion (45) protruding to the (Continued)

inner peripheral side. The annular protrusion (45) is inserted into the annular recess (21) of the front ring (4).

15 Claims, 14 Drawing Sheets

(51) Int. Cl.
  *G03B 11/00* (2006.01)
  *G03B 17/06* (2006.01)
  *G03B 11/04* (2006.01)
  *G03B 17/56* (2006.01)
(58) Field of Classification Search
  USPC .......................................................... 396/544
  See application file for complete search history.

(56) References Cited

U.S. PATENT DOCUMENTS

2010/0111519 A1* 5/2010 Kobayashi ............. G03B 11/00
  396/544
2016/0091778 A1* 3/2016 Kobayashi ............. G03B 11/00
  359/892
2017/0017025 A1* 1/2017 Jidai ..................... G03B 11/00

FOREIGN PATENT DOCUMENTS

| | | |
|---|---|---|
| CN | 103885152 A | 6/2014 |
| EP | 2752696 A1 | 7/2014 |
| JP | S55-029425 U | 2/1980 |
| JP | S58-098623 U | 7/1983 |
| JP | 2005-107347 A | 4/2005 |
| JP | 2005-301172 A | 10/2005 |
| JP | 2014-052507 A | 3/2014 |
| JP | 3193897 U | 10/2014 |

OTHER PUBLICATIONS

Written Opinion of the International Searching Authority for PCT/JP2016/050207, dated Mar. 8, 2016.

* cited by examiner

CAMERA FILTER FRAME AND CAMERA FILTER UNIT

FIELD

The present invention relates to a camera filter frame in which a front ring for holding an optical element is rotatably held by a rear ring. The present invention also relates to a camera filter unit in which the camera filter frame holds an optical element such as a polarization filter.

BACKGROUND

A camera filter frame for holding a polarization filter is disclosed in Patent Literature 1. The camera filter frame of Patent Literature 1 includes a front ring for holding the polarization filter and a rear ring for holding the front ring. The front ring includes an annular recess that is recessed to the inner peripheral side on the outer peripheral surface of the front ring. The rear ring includes an annular recess that is recessed to the outer peripheral side on the inner peripheral surface of the rear ring. The front ring and the rear ring are combined in such a manner that the respective annular recesses face each other in the radial direction, and a washer is inserted into an annular space formed by the annular recess of the front ring and the annular recess of the rear ring. The washer has its outer peripheral portion positioned in the annular recess of the rear ring and its inner peripheral portion positioned in the annular recess of the front ring. This structure enables the front ring and the rear ring to rotate relatively to each other about the axis with the washer as a guide.

CITATION LIST

Patent Literature

Patent Literature 1: Japanese Patent Application Publication No. 2005-301172

SUMMARY

Technical Problem

In order to insert a washer into an annular space formed by the annular recess of the front ring and the annular recess of the rear ring, a C-shaped washer is first placed in the annular recess provided to the outer peripheral surface of the front ring. Next, open ends of the washer are brought closer to each other to reduce the outside diameter of the washer so as to combine the front ring and the rear ring. The annular recess of the front ring and the annular recess of the rear ring are then caused to face each other. As a result, an annular space is formed between the front ring and the rear ring, and then the washer's own shape restoring force separates the open ends from each other to restore the outside diameter of the washer. Consequently, the washer has the outer peripheral portion positioned in the annular recess of the rear ring and the inner peripheral portion positioned in the annular recess of the front ring.

A washer that expands and contracts in the radial direction is easy to be distorted. It is also difficult to maintain the washer placed in the annular space in a position orthogonal to the axis of each ring. Therefore, in the structure in which the front ring and the rear ring are caused to rotate relatively to each other with the washer as a guide, the washer comes into contact with each ring at random, which might cause the front ring not to rotate smoothly relative to the rear ring.

In view of the foregoing, an object of the present invention is to provide a camera filter frame in which a rear ring rotatably holds a front ring for holding an optical element with a simple structure using no washer. Another object of the present invention is to provide a camera filter unit in which the camera filter frame holds an optical element.

Solution to Problem

To achieve the above object, a camera filter frame according to the present invention includes a front ring that holds an optical element on the inner peripheral side thereof and includes an annular recess on the outer peripheral surface thereof, and a rear ring that includes, on the inner peripheral surface thereof, an annular protrusion inserted into the annular recess and that holds the front ring rotatably.

According to the present invention, the front ring can rotate about the axis using the annular protrusion of the rear ring that is inserted into the annular recess as a guide. Consequently, no washer needs to be used to allow the rear ring to hold the front ring rotatably. In the case in which the front ring is rotated using the annular protrusion that is disposed in the rear ring as a guide, the guide (annular protrusion) does not become distorted, nor does the position of the guide (annular protrusion) change. The annular protrusion serving as a guide can be formed more accurately than a washer or the like that expands and contracts in the radial direction. Furthermore, because no member such as a washer is interposed between the front ring and the rear ring, the front ring and the rear ring can be combined accurately. The front ring held by the rear ring can therefore be rotated smoothly.

In the present invention, the front ring includes an annular wall portion extending in the radial direction, an annular plate portion extending rearward from the inner peripheral end of the annular wall portion, and an annular projection portion projecting for a shorter distance than the annular wall portion from the rear end of the annular plate portion toward the outer peripheral side. The annular recess is formed by the annular wall portion, the annular plate portion, and the annular projection portion. A position of the annular protrusion is between the annular wall portion and the annular projection portion in the fore-and-aft direction and the annular plate portion is bent to the outer peripheral side to displace the annular projection portion to the outer peripheral side and the state in which the annular protrusion is inserted into the annular recess is created. In other words, in the present invention, the front ring includes an annular wall portion extending in the radial direction, an annular plate portion extending rearward from the inner peripheral end of the annular wall portion, and an annular projection portion projecting for a shorter distance than the annular wall portion from the rear end of the annular plate portion toward the outer peripheral side. The annular recess is formed by the annular wall portion, the annular plate portion, and the annular projection portion. The annular wall portion includes a bent portion that is bent to the outer peripheral side. This structure facilitates creating the state in which the annular protrusion of the rear ring is inserted into the annular recess of the front ring.

In the present invention, it is preferable that the annular plate portion include an annular groove on at least one of the inner peripheral surface and the outer peripheral surface thereof, and that a portion in which the annular groove is formed in the annular plate portion be bent to displace the annular projection portion to the outer peripheral side. In other words, it is preferable that the annular plate portion include an annular groove on at least one of the inner peripheral surface and the outer peripheral surface thereof, and that a portion in which the annular groove is formed in the annular plate portion be a bent portion that is bent to the outer peripheral side. Because the portion in which the annular groove is formed is thinner than other portions, the rear annular plate portion can be bent accurately with relatively weak force by bending this thin portion. Consequently, annular projection portion can be displaced accurately. This can improve the accuracy of dimension between the annular protrusion of the rear ring and the annular recess of the front ring, preventing the front ring from rattling on the rear ring. The front ring can therefore be rotated smoothly.

In the present invention, the camera filter frame can include a front stopper that restricts the forward movement of the optical element, and a rear stopper that restricts the rearward movement of the optical element. The front ring can include a holding portion for holding the optical element in a position closer to the front side than the position of the annular wall portion is, the front stopper can be attached to the inner peripheral surface of the front ring, and the rear stopper can be the annular wall portion. This structure can restrict the back-and-forth movement of the optical element that is held to the front ring.

In this case, the front ring preferably holds the optical element between the front stopper and the rear stopper in a rotatable manner about the axis. In this manner, stress (pressure) to be placed on the optical element can be reduced compared with the case in which the optical element is held to the front ring in an unrotatable manner while being gripped by the front stopper and the rear stopper from the front and rear. Because distortion can be prevented from occurring in the optical element with lower stress placed on the optical element, finer images and videos can be obtained when, for example, images and videos the resolution of which is many times higher than full high-definition ones are shot.

It is preferable that the rear ring include an annular portion positioned on the outer peripheral side of the holding portion closer to the front side than the annular protrusion is, and that the holding portion include an adhesive injection hole passing therethrough in a direction intersecting the axis of the holding portion. In this manner, after the optical element is held to the holding portion, an adhesive can be injected through the adhesive injection hole to fix the optical element to the front ring. Because the annular portion of the rear ring is positioned on the outer peripheral side of the holding portion, the adhesive injection hole is not exposed to the outer peripheral side even in the case in which the adhesive injection hole is provided in the holding portion. Consequently, the adhesive injection hole does not impair the appearance of the camera filter frame.

In the present invention, the camera filter frame can include an inner ring that is inserted into the front ring, and a rear stopper that restricts the rearward movement of the optical element. The inner ring can include an annular frame for holding the optical element from the outer peripheral side, and a front stopper that protrudes from the front edge of the annular frame to the inner peripheral side to restrict the forward movement of the optical element. The front ring can hold the inner ring in a position closer to the front side than the position of the annular wall portion is, and the rear stopper can be the annular wall portion. This structure allows the front ring to hold the optical element via the inner ring. This structure can also restrict the back-and-forth movement of the optical element that is held to the front ring.

In this case, the front ring preferably holds the optical element between the front stopper and the rear stopper in a rotatable manner about the axis. In this manner, stress (pressure) to be placed on the optical element can be reduced compared with the case in which the optical element is held to the front ring in an unrotatable manner while being gripped by the front stopper and the rear stopper from the front and rear. Because distortion can be prevented from occurring in the optical element with lower stress placed on the optical element, finer images and videos can be obtained when, for example, images and videos the resolution of which is many times higher than full high-definition ones are shot.

The annular frame can include an adhesive injection hole passing therethrough in a direction intersecting the axis of the annular frame. In this manner, after the optical element is held to the annular frame, an adhesive can be injected through the adhesive injection hole to fix the optical element to the annular frame. Because the annular frame is held on the inner side of the front ring, the adhesive injection hole is not exposed to the outer peripheral side even in the case in which the adhesive injection hole is provided in the annular frame. Consequently, the adhesive injection hole does not impair the appearance of the camera filter frame.

In the present invention, it is preferable that the rear ring include an external thread in the rear end of the outer peripheral surface thereof, and that the annular protrusion be disposed in a position overlapping the external thread when seen from the radial direction. In this manner, the dimension of the camera filter frame can be reduced in the fore-and-aft direction (axial direction) compared with the case in which the annular protrusion is formed in a position different from that of the external thread in the axial direction.

In the present invention, the rear ring can hold a second optical element on the inner peripheral side thereof. Specifically, the camera filter frame can hold a first optical element to the front ring and a second optical element to the rear ring.

In the present invention, the camera filter frame can include a second front stopper that restricts the forward movement of the second optical element, and a second rear stopper that restricts the rearward movement of the second optical element. The rear ring can include a second annular projection portion that projects to the inner peripheral side closer to the rear than the front ring does, and a rear holding portion for holding the second optical element at the rear of the second annular projection portion. The second front stopper can be the second annular projection portion, and the second rear stopper can be attached to the inner peripheral surface of the rear ring. This structure can restrict the back-and-forth movement of the second optical element that is held to the rear ring.

In this case, the rear ring preferably holds the second optical element between the second front stopper and the second rear stopper in a rotatable manner about the axis. In this manner, stress (pressure) to be placed on the second optical element can be reduced compared with the case in which the second optical element is held to the rear ring in an unrotatable manner while being gripped by the second front stopper and the second rear stopper from the front and rear. Because distortion can be prevented from occurring in the second optical element with lower stress placed on the second optical element, finer images and videos can be obtained when, for example, images and videos the resolution of which is many times higher than full high-definition ones are shot.

In the present invention, the camera filter frame can include a rear inner ring that is inserted into the rear ring, and a second front stopper that restricts the forward movement of the second optical element. The rear ring can include a second annular projection portion that projects to the inner peripheral side at the rear of the front ring. The rear inner ring can include a rear annular frame that is positioned at the rear of the second annular projection portion and that holds the second optical element from the outer peripheral side, and a second rear stopper that projects from the rear annular frame to the inner peripheral side to restrict the rearward movement of the second optical element. The second front stopper can be the second annular projection portion. This structure can restrict the back-and-forth movement of the optical element that is held to the rear ring.

In this case, the rear ring preferably holds the second optical element between the second front stopper and the second rear stopper in a rotatable manner about the axis. In this manner, stress (pressure) to be placed on the second optical element can be reduced compared with the case in which the second optical element is held to the rear ring in an unrotatable manner while being gripped by the second front stopper and the second rear stopper from the front and rear. Because distortion can be prevented from occurring in the second optical element with lower stress placed on the second optical element, finer images and videos can be obtained when, for example, images and videos the resolution of which is many times higher than full high-definition ones are shot.

A camera filter unit according to the present invention includes the camera filter frame as described above and a polarization filter that is held by the front ring as the optical element.

According to the present invention, the front ring for holding the polarization filter can be rotated smoothly with respect to the rear ring.

DESCRIPTION OF EMBODIMENTS

The following describes a camera filter unit to which the present invention is applied with reference to the drawings.

First Embodiment

Figure 1:
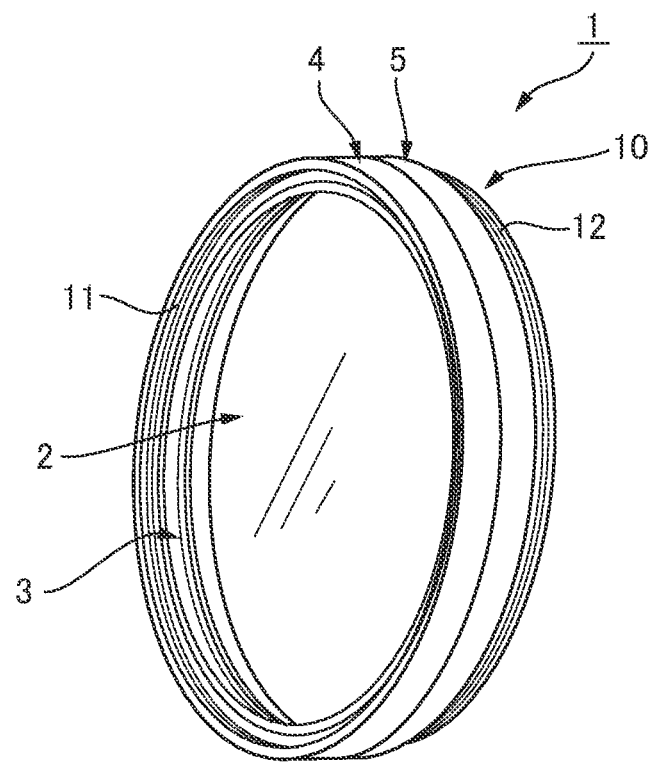
FIG. 1 is a perspective view of a camera filter unit according to a first embodiment.
Figure 2A:
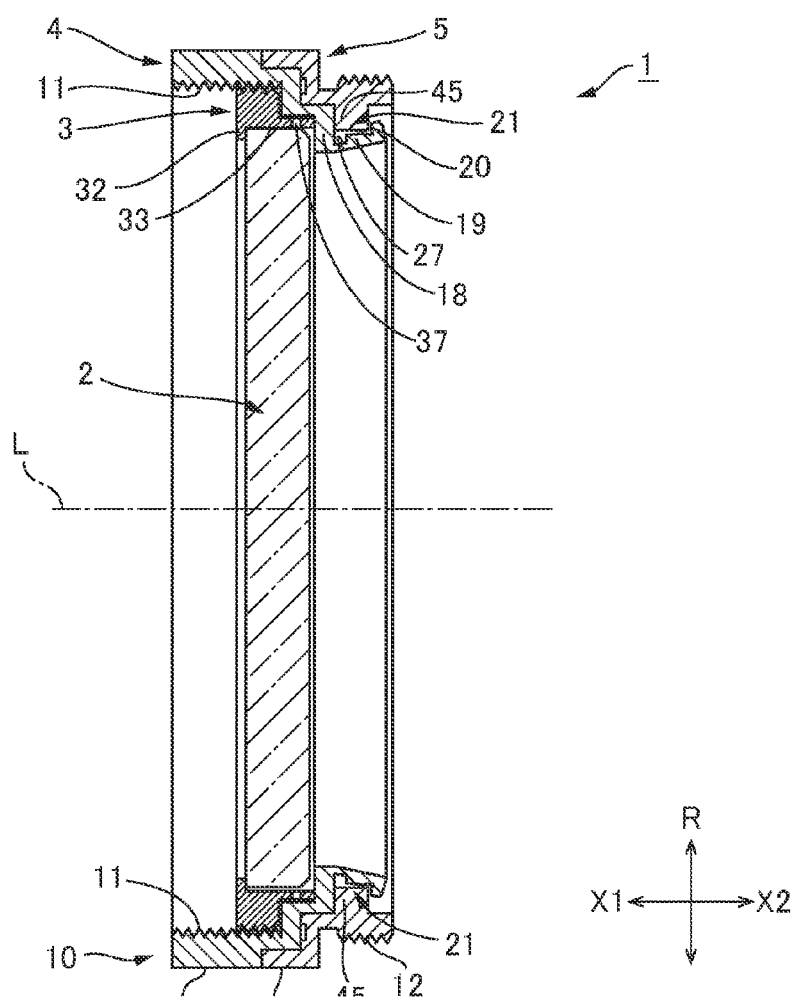
FIG. 2 includes a longitudinal sectional view and a partially enlarged sectional view of the camera filter unit according to the first embodiment.
Figure 2B:
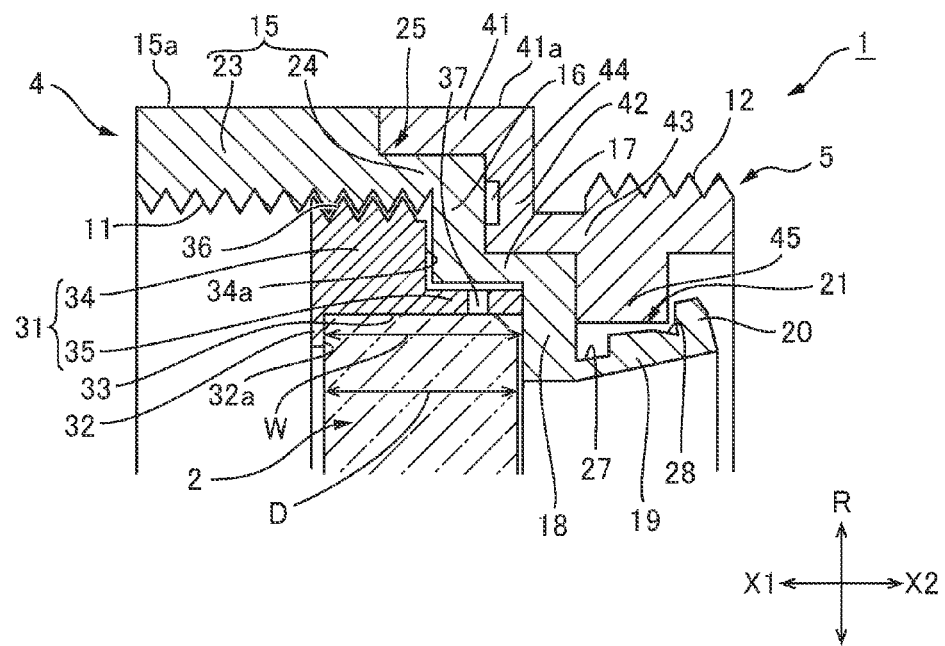

FIG. 1 is a perspective view of a camera filter unit according to a first embodiment. FIG. 2(a) is a longitudinal sectional view of the camera filter unit in FIG. 1. FIG. 2(b) is a partially enlarged sectional view thereof. As illustrated in FIG. 1 and FIG. 2(a), a camera filter unit 1 according to the present embodiment includes a disc-like polarization filter (optical element) 2, an inner ring 3 for holding the polarization filter 2 coaxially, a front ring 4 for holding the inner ring 3 coaxially from the outer peripheral side, and a rear ring 5 for holding the front ring 4 coaxially. The front ring 4 holds the polarization filter 2 via the inner ring 3. The rear ring 5 holds the front ring 4 rotatably about an axis L. The inner ring 3, the front ring 4, and the rear ring 5 constitute a camera filter frame 10. In the following description, the direction of the inner ring 3, the front ring 4, and the rear ring 5 along the axis L is assumed to be a fore-and-aft direction X of the camera filter unit 1. In the fore-and-aft direction X, the side on which the front ring 4 is positioned is assumed to be the front side (front X1), and the side on which the rear ring 5 is positioned is assumed to be the rear side (rear X2).

The front ring 4 holds the inner ring 3 in a position where the inner ring 3 is not exposed from the front end of the front ring 4. On the inner peripheral surface of the front ring 4, an internal thread 11 is provided in a region of a certain width from the front edge toward the rear X2. The exposed portion of the internal thread 11 that is exposed to the front side more than the inner ring 3 is a front mounting portion for mounting a cap or a hood into the front of the camera filter unit 1. On the outer peripheral surface of the rear ring 5, an external thread 12 is provided in a region of a certain width from the rear edge toward the front X1. The external thread 12 is a rear mounting portion for mounting the camera filter unit 1 into a lens-barrel of an imaging lens or a camera. The inner ring 3, the front ring 4, and the rear ring 5 are all formed of a metal base. In the present embodiment, the inner ring 3, the front ring 4, and the rear ring 5 are all made of aluminum.

(Front Ring)

As illustrated in FIG. 2(b), the front ring 4 includes a front annular plate portion 15 extending in the fore-and-aft direction X along the axis L, a front annular wall portion 16 extending from the rear end of the front annular plate portion 15 toward the inner peripheral side in a radial direction R orthogonal to the axis L, an intermediate annular plate portion 17 extending from the inner peripheral end of the front annular wall portion 16 to the rear X2 along the axis L, a rear annular wall portion (annular wall portion) 18 extending from the rear end of the intermediate annular plate portion 17 toward the inner peripheral side in the radial direction R, a rear annular plate portion 19 extending from the inner peripheral end of the rear annular wall portion 18 to the rear X2, and an annular projection portion 20 projecting for a shorter distance than the rear annular wall portion 18 from the rear end of the rear annular plate portion 19 toward the outer peripheral side. On the outer peripheral surface of the front ring 4, an annular recess 21 is formed by the rear annular wall portion 18, the rear annular plate portion 19, and the annular projection portion 20.

The front annular plate portion 15 includes a thick portion 23 and a thin portion 24 in this order from the front X1 toward the rear X2. The thick portion 23 projects to the outer peripheral side more than the thin portion 24 does. An annular step 25 is formed by the thick portion 23 and the thin portion 24 on the outer peripheral surface of the front annular plate portion 15. The internal thread 11 serving as a front mounting portion is formed on the inner peripheral surface of the front annular plate portion 15.

The front annular wall portion 16 has a constant thickness dimension in the fore-and-aft direction X. The intermediate annular plate portion 17 has a constant thickness in the radial direction R. The rear annular wall portion 18 has a constant thickness dimension in the fore-and-aft direction X.

The rear annular plate portion 19 inclines to the outer peripheral side toward the rear X2. More specifically, the front end of the outer peripheral surface of the rear annular plate portion 19 (portion adjacent to the rear annular wall portion 18) is provided with an annular groove 27, and the portion in which the annular groove 27 is formed is bent to the outer peripheral side so that the rear annular plate portion 19 inclines to the outer peripheral side. Specifically, in the rear annular plate portion 19, the portion in which the annular groove 27 is formed is a bent portion that is bent to the outer peripheral side. The rear portion of the outer peripheral surface of the rear annular plate portion 19 (portion adjacent to the annular projection portion 20) is provided with an annular notch 28. The notch 28 is shallower than the annular groove 27.

The annular projection portion 20 projects in a direction orthogonal to the rear annular plate portion 19. Consequently, the annular projection portion 20 extends to the front X1 toward the outer peripheral side. In the present embodiment, the annular projection portion 20 has a trapezoidal sectional shape tapering toward the tip. The inner peripheral portion of an annular protrusion 45 provided to the rear ring 5 is inserted into the annular recess 21 formed by the rear annular wall portion 18, the rear annular plate portion 19, and the annular projection portion 20.

(Inner Ring)

The inner ring 3 includes an annular frame 31 for holding the polarization filter 2 coaxially from the outer peripheral side, and an annular front stopper 32 that projects from the front edge of the annular frame 31 to the inner peripheral side to restrict the movement of the polarization filter 2 to the front X1. The front stopper 32 is abuttable from the front X1 on the outer peripheral edge of the polarization filter 2 that is held by the annular frame 31.

The inner peripheral surface of the annular frame 31 is an annular surface that extends with a constant diameter dimension along the axis L, and is a filter holding surface 33 for holding the polarization filter 2 coaxially. The annular frame 31 includes a thick frame portion 34 and a thin frame portion 35 in this order from the front X1 toward the rear X2. The outer peripheral surface of the thick frame portion 34 is positioned closer to the outer peripheral side than the outer peripheral surface of the thin frame portion 35 is, and between these portions, an annular rearward surface 34a is formed that extends along the radial direction R. On the outer peripheral surface of the thick frame portion 34, an external thread 36 is formed that can be threadedly engaged with the internal thread 11 of the front ring 4. In the thin frame portion 35, an adhesive injection hole 37 is formed that passes through the thin frame portion in the radial direction R to be open on the filter holding surface 33.

If an adhesive is injected from the outer peripheral side of the annular frame 31 through the adhesive injection hole 37 with the polarization filter 2 held to the filter holding surface 33, the adhesive enables the polarization filter 2 to be fixed to the inner ring 3. The number of adhesive injection holes 37 may be one, but a plurality of adhesive injection holes 37 are open on the thin frame portion 35 at equal angular intervals in the present embodiment.

The front stopper 32 is an annular protrusion that protrudes from the front edge of the annular frame 31 toward the inner peripheral side. The front stopper 32 includes an annular rear end surface 32a that is a flat surface orthogonal to the axis L. The front stopper 32 has a width dimension from the annular rear end surface 32a to the rear end of the annular frame 31 (width dimension W of the filter holding surface 33) larger than a thickness dimension D of the polarization filter 2 held by the filter holding surface 33. The difference between the width dimension W of the filter holding surface 33 in the fore-and-aft direction X and the thickness dimension D of the polarization filter 2 is 0.03 mm or less.

The inner ring 3 is inserted from the front side into the front ring 4 with the polarization filter 2 held to the inner peripheral side of the front annular frame 31. The external thread 36 of the inner ring 3 is then threadedly engaged with the internal thread 11 of the front ring 4 to be screwed until the rear end of the annular frame 31 abuts on the rear annular wall portion 18 of the front ring 4. When the rear end of the annular frame 31 abuts on the rear annular wall portion 18, the annular rearward surface 34a of the inner ring 3 faces the front annular wall portion 16 of the front ring 4 in the fore-and-aft direction X with a minute spacing allowed therebetween. The outer peripheral surface of the thin frame portion 35 of the annular frame 31 also faces the intermediate annular plate portion 17 in the radial direction R with a minute spacing therebetween. With the rear end of the annular frame 31 abutting on the rear annular wall portion 18, the distance (width dimension W of the filter holding surface 33) between the front stopper 32 and the rear annular wall portion 18 is larger than the thickness dimension D of the polarization filter 2. Consequently, the front ring 4 holds the polarization filter 2 rotatably about the axis L between the front stopper 32 and the rear annular wall portion 18. Specifically, the front stopper 32 and the rear annular wall portion 18 do not grip the polarization filter 2 unrotatably. The polarization filter 2 is fixed to the inner ring 3 unrotatably by the adhesive. The rear annular wall portion 18 functions as a rear stopper that prevents the polarization filter 2 from moving to the rear X2.

When the rear end of the annular frame 31 abuts on the rear annular wall portion 18 by screwing the inner ring 3 into the front ring 4, the annular rearward surface 34a of the inner ring 3 may abut on the front annular wall portion 16 of the front ring 4.

(Rear Ring)

The rear ring 5 includes a front annular plate portion 41 extending in the fore-and-aft direction X along the axis L, an annular wall portion 42 extending from the rear end of the front annular plate portion 41 toward the inner peripheral side in the radial direction R, and a rear annular plate portion 43 extending from the inner peripheral end of the annular wall portion 42 to the rear X2 along the axis L. The front annular plate portion 41 has a constant thickness dimension in the radial direction R. A grease holding recess 44 is formed on the front end surface of the annular wall portion 42. The grease holding recess 44 holds grease to slide the front ring 4 and the rear ring 5 smoothly. The external thread 12 serving as a rear mounting portion is formed on the outer peripheral surface of the rear annular plate portion 43. The annular protrusion 45 that protrudes toward the inner peripheral side in the radial direction R is disposed on the inner peripheral surface of the rear annular plate portion 43.

The annular protrusion 45 includes a rectangular sectional shape. The annular protrusion 45 has a width dimension in the fore-and-aft direction X larger than the protrusion dimension to the inner peripheral side. The annular protrusion 45 is formed in a position overlapping the external thread 12 when seen from the radial direction R.

With the rear ring 5 holding the front ring 4, the front annular plate portion 41 is slidably fitted into the annular step 25 of the front ring 4. This structure allows the outer peripheral surface 41a of the front annular plate portion 41 to be steplessly continuous to the outer peripheral surface 15a of the thick portion 23 in the front annular plate portion 15 of the front ring 4. The annular wall portion 42 abuts on the front annular wall portion 16 of the front ring 4 from the rear X2, while the rear annular plate portion 43 abuts on the intermediate annular plate portion 17 of the front ring 4 from the outer peripheral side. The annular protrusion 45 abuts on the rear annular wall portion 18 of the front ring 4 from the rear X2. The inner peripheral portion of the annular protrusion 45 is inserted into the annular recess 21 on the outer peripheral surface of the inner ring 3. This structure allows the rear ring 5 to hold the front ring 4 rotatably about the axis L.

(Assembly of Camera Filter Unit)

FIG. 3 is a diagram for describing an assembling operation of the camera filter unit 1. In order to assemble the camera filter unit 1, the front ring 4 and the rear ring 5 are first combined with each other in the fore-and-aft direction X so that the position of the annular protrusion 45 of the rear ring 5 is between the rear annular wall portion 18 of the front ring 4 and the annular projection portion 20 in the fore-and-aft direction X.

Figure 3A:
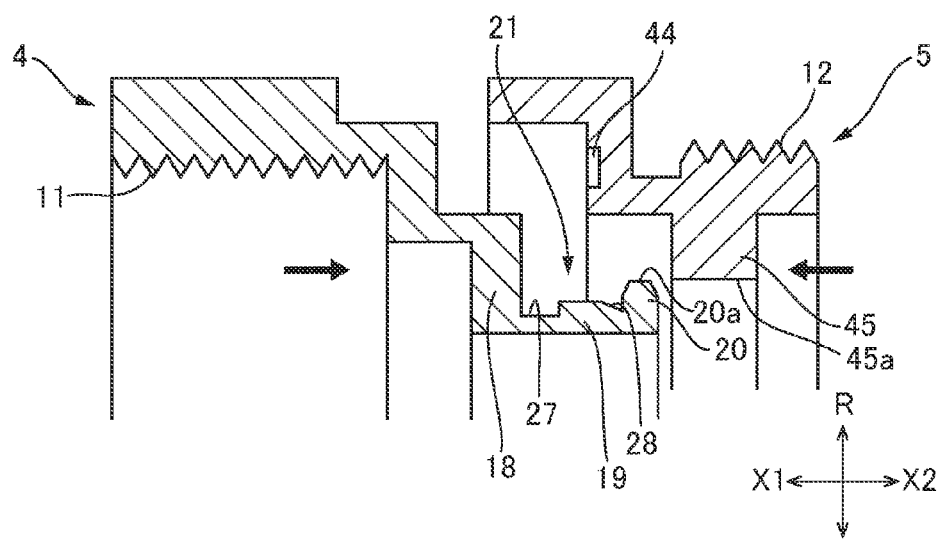
FIG. 3 includes diagrams for describing an assembly method of the camera filter unit.

In the state before the front ring 4 and the rear ring 5 are combined, the rear annular plate portion 19 of the front ring 4 extends along the axis L, as illustrated in FIG. 3(a). Thus, the annular projection portion 20 projects from the rear end of the rear annular plate portion 19 in the radial direction R, and an outer peripheral end surface 20a of the annular projection portion 20 extends parallel to the axis L. The annular groove 27 includes a rectangular section. The notch 28 is notched downward toward the rear X2 and has a triangular sectional shape. When the front ring 4 and the rear ring 5 are disposed coaxially, the outer peripheral end surface 20a of the annular projection portion 20 of the front ring 4 is positioned flush with an inner peripheral end surface 45a of the annular protrusion 45 of the rear ring 5 or positioned slightly closer to the inner peripheral side than the inner peripheral end surface 45a is. Consequently, the front ring 4 and the rear ring 5 are brought closer to each other while being maintained coaxially, whereby the annular protrusion 45 of the rear ring 5 can be positioned between the rear annular wall portion 18 of the front ring 4 and the annular projection portion 20.

Figure 3B:
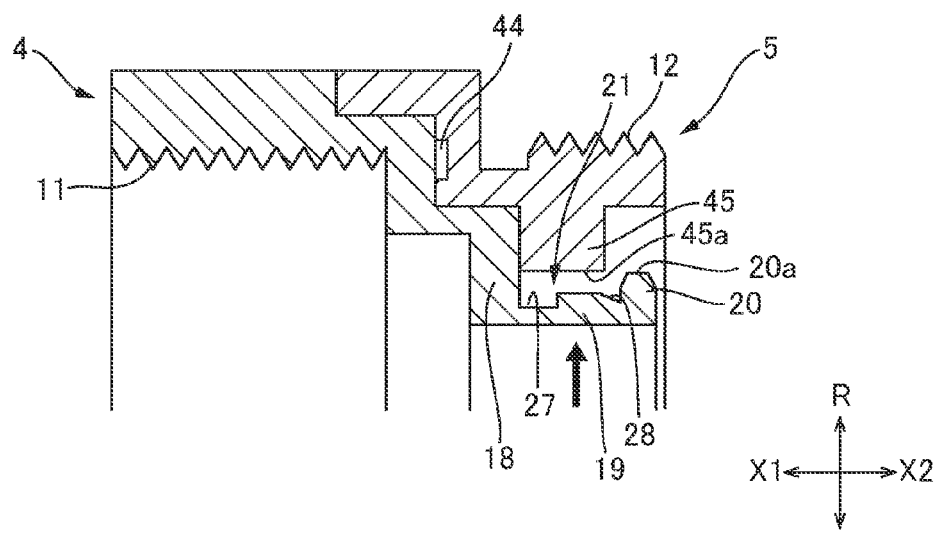

As illustrated in FIG. 3(b), the annular protrusion 45 of the rear ring 5 is then caused to abut on the rear annular wall portion 18 of the front ring 4 from the rear X2. Subsequently, the rear annular plate portion 19 of the front ring 4 is bent (plastically deformed) to the outer peripheral side to displace the annular projection portion 20 to the outer peripheral side. This structure creates the state in which the annular protrusion 45 of the rear ring 5 is inserted into the annular recess 21 of the front ring 4.

Figure 3C:
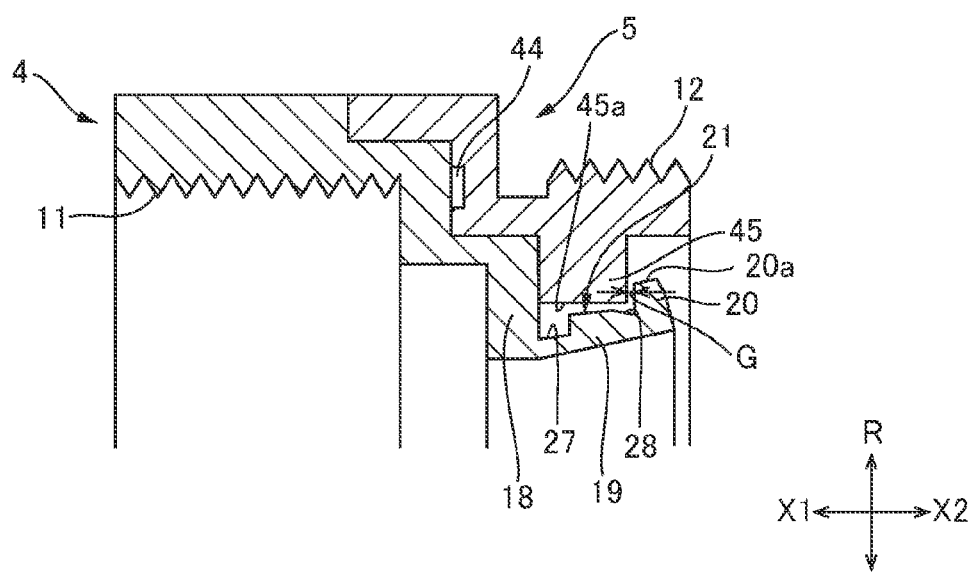

When the rear annular plate portion 19 of the front ring 4 is bent to the outer peripheral side, a force exerted from the inner peripheral side to the outer peripheral side in the radial direction R is applied to the rear annular plate portion 19. As a result, the rear annular plate portion 19 is bent at the portion on the front end side the thickness of which is reduced by the formation of the annular groove 27, as illustrated in FIG. 3(c). Additionally, the rear annular plate portion 19 is bent to the outer peripheral side, whereby the annular projection portion 20 projects to the outer peripheral side more than the inner peripheral end surface 45a of the annular protrusion 45 does. Consequently, the state in which the annular protrusion 45 is inserted into the annular recess 21 is created. The notch 28 serves as a relief part to avoid causing the rear annular plate portion 19 to abut on the annular protrusion 45 when the rear annular plate portion 19 is bent to the outer peripheral side.

In the present embodiment, the portion the thickness of which is reduced by the formation of the annular groove 27 is provided to the front end of the rear annular plate portion 19 so as to bend the thin portion to the outer peripheral side. Consequently, the rear annular plate portion 19 can be bent accurately with relatively weak force. This enables the annular projection portion 20 to be displaced accurately to the outer peripheral side, improving the accuracy of dimension between the annular protrusion 45 of the rear ring 5 and the annular recess 21 of the front ring 4. The annular projection portion 20 of the front ring 4 can therefore be opposed to the annular protrusion 45 of the rear ring 5 at the rear X2 with a minute spacing G that is set in advance allowed therebetween. In the present embodiment, the spacing G can be between 0.03 mm and 0.1 mm. Consequently, the front ring 4 can be prevented from rattling on the rear ring 5 when the front ring 4 is rotated. The front ring 4 can also be rotated smoothly with respect to the rear ring 5.

Thereafter, the polarization filter 2 is inserted into the inner ring 3 from the rear X2, causing the polarization filter 2 to abut on the front stopper 32. Additionally, an adhesive is injected through the adhesive injection hole 37 to fix the polarization filter 2 to the inner ring 3. The inner ring 3 is then screwed into the front ring 4 from the front X1, causing the rear end of the annular frame 31 of the inner ring 3 to abut on the rear annular wall portion 18 of the front ring 4. This completes the camera filter unit 1. In the state in which the camera filter unit 1 is completed, the polarization filter 2 is held by the front ring 4 between the front stopper 32 and the rear annular wall portion 18 in a rotatable manner about the axis L while being fixed to the inner ring 3 unrotatably by the adhesive.

An adhesive may be applied to the annular rearward surface 34a of the inner ring 3 or the front annular wall portion 16 of the front ring 4 in advance to fix the inner ring 3 to the front ring 4 by the adhesive.

(Working Effect)

According to the present embodiment, the front ring 4 can rotate about the axis L using the annular protrusion 45 of the rear ring 5 that is inserted into the annular recess 21 as a guide. Consequently, no washer needs to be used to allow the rear ring 5 to hold the front ring 4 rotatably. In the case in which the front ring 4 is rotated using the annular protrusion 45 that is disposed in the rear ring 5 as a guide, the guide (annular protrusion 45) does not become distorted, nor does the position of the guide (annular protrusion 45) change. The annular protrusion 45 serving as a guide can be formed more accurately than a washer that expands and contracts in the radial direction, for example. Furthermore, because the present embodiment enables the annular projection portion 20 to be displaced accurately to the outer peripheral side, the accuracy of dimension between the annular protrusion 45 of the rear ring 5 and the annular recess 21 of the front ring 4 is high. In addition to this, because no member such as a washer is interposed between the front ring 4 and the rear ring 5, the front ring 4 and the rear ring 5 can be combined accurately. The front ring 4 held by the rear ring 5 can therefore be rotated smoothly.

The annular protrusion 45 of the rear ring 5 is disposed in a position overlapping the external thread 36 when seen from the radial direction R. Consequently, the dimension of the camera filter frame 10 can be reduced in the fore-and-aft direction X compared with the case in which the annular protrusion 45 is formed in a position different from that of the external thread 36 in the direction of the axis L.

Furthermore, the polarization filter 2 is held by the front ring 4 between the front stopper 32 and the rear annular wall portion 18 in a rotatable manner about the axis L, and is fixed to the inner ring 3 unrotatably by the adhesive. Consequently, stress (pressure) to be placed on the polarization filter 2 can be reduced compared with the case in which the polarization filter 2 is held to the front ring 4 in an unrotatable manner while being gripped by the front stopper 32 and the rear annular wall portion 18 (rear stopper) from the front and rear. Because distortion can be prevented from occurring in the polarization filter 2 with lower stress placed on the polarization filter 2, finer images and videos can be obtained when, for example, images and videos the resolution of which is many times higher than full high-definition ones are shot.

The adhesive injection hole 37 is formed in the inner ring 3 that is held on the inner peripheral side of the front ring 4, which prevents the adhesive injection hole 37 from being exposed to the outer peripheral side not to impair the appearance of the camera filter frame 10.

The width dimension W of the filter holding surface 33 can be the same as the thickness dimension D of the polarization filter 2, and a structure can also be employed in which the polarization filter 2 is gripped unrotatably between the front stopper 32 and the rear annular wall portion 18 when the rear end of the annular frame 31 is caused to abut on the rear annular wall portion 18.

Second Embodiment

Figure 4A:
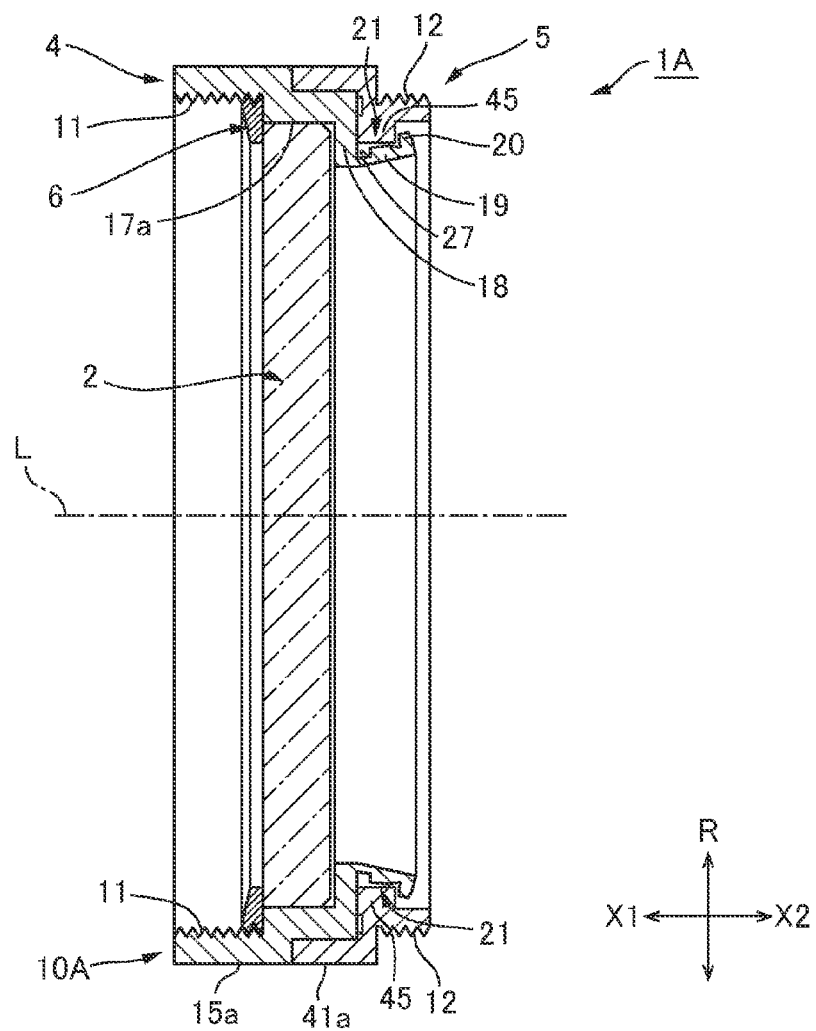
FIG. 4 includes a longitudinal sectional view and a partially enlarged sectional view of the camera filter unit according to a second embodiment.
Figure 4B:
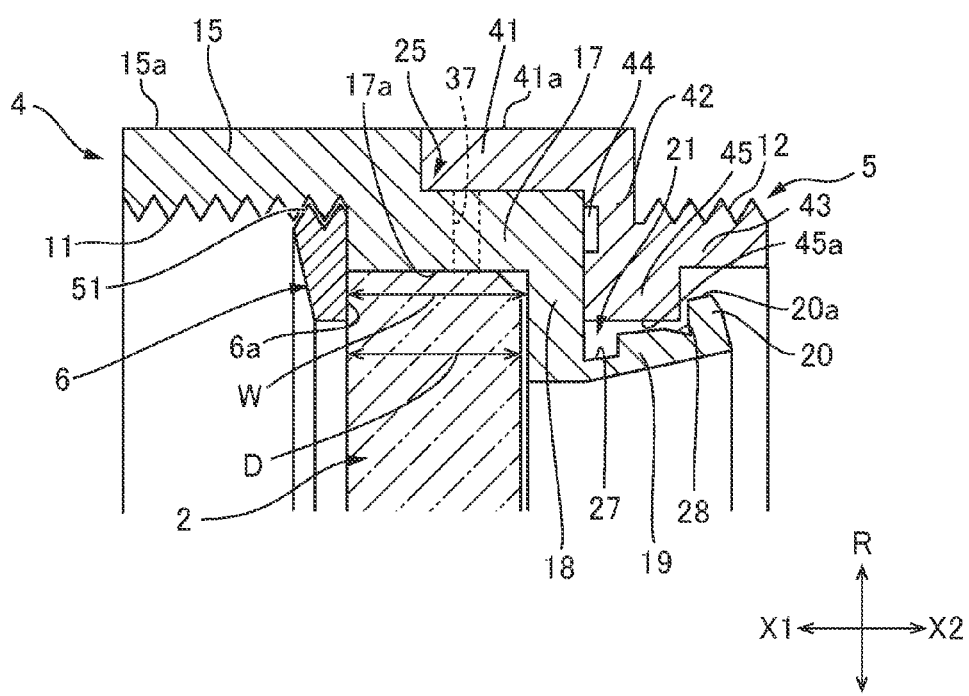

FIG. 4(a) is a longitudinal sectional view of a camera filter unit according to a second embodiment. FIG. 4(b) is a partially enlarged sectional view thereof. As illustrated in FIG. 4(a), a camera filter unit 1A according to the present embodiment includes a disc-like polarization filter (optical element) 2, a front ring 4 for holding the polarization filter 2 coaxially, and a rear ring 5 for holding the front ring 4 rotatably about the axis L. The camera filter unit 1A also includes a front stopper 6 that is attached to the inner peripheral surface of the front ring 4 and restricts the movement of the polarization filter 2 to the front X1. The front ring 4, the rear ring 5, and the front stopper 6 constitute a camera filter frame 10A. Note that the camera filter unit 1A according to the present embodiment includes components corresponding to those of the camera filter unit 1, and thus the same reference numerals are given to the corresponding components for description thereof.

As illustrated in FIG. 4(a), on the inner peripheral surface of the front ring 4, an internal thread 11 is provided in a region of a certain width from the front edge toward the rear X2. The front portion of the internal thread 11 that is exposed to the front side more than the front stopper 6 is a front mounting portion for mounting a cap or a hood into the front of the camera filter unit 1A. On the outer peripheral surface of the rear ring 5, an external thread 36 is provided in a region of a certain width from the rear edge toward the front X1. The external thread 36 is a rear mounting portion for mounting the camera filter unit 1A into a lens-barrel of an imaging lens or a camera. The front stopper 6, the front ring 4, and the rear ring 5 are all formed of a metal base. In the present embodiment, the front stopper 6, the front ring 4, and the rear ring 5 are made of aluminum.

(Front Ring)

As illustrated in FIG. 4(b), the front ring 4 includes a front annular plate portion 15 extending in the fore-and-aft direction X along the axis L, an intermediate annular plate portion (holding portion) 17 that is continuous to the rear end of the front annular plate portion 15 and extends on the inner peripheral side of the front annular wall portion 15 to the rear X2 along the axis L, a rear annular wall portion (annular wall portion) 18 extending from the rear end of the intermediate annular plate portion 17 toward the inner peripheral side in the radial direction R orthogonal to the axis L, a rear annular plate portion 19 extending from the inner peripheral end of the rear annular wall portion 18 to the rear X2, and an annular projection portion 20 projecting for a shorter distance than the rear annular wall portion 18 from the rear end of the rear annular plate portion 19 toward the outer peripheral side. On the outer peripheral surface of the front ring 4, an annular step 25 is formed by the front annular wall portion 15 and the intermediate annular plate portion 17. On the outer peripheral surface of the front ring 4, an annular recess 21 is also formed by the rear annular wall portion 18, the rear annular plate portion 19, and the annular projection portion 20.

The internal thread 11 serving as a front mounting portion is formed on the inner peripheral surface of the front annular plate portion 15. The intermediate annular plate portion 17 has a constant thickness in the radial direction R. The inner peripheral surface of the intermediate annular plate portion 17 (surface positioned between the front end surface of the intermediate annular plate portion 17 and the front end surface of the rear annular wall portion 18) is an annular surface that extends with a constant diameter dimension along the axis L, and is a filter holding surface 17a for holding the polarization filter 2 coaxially. The filter holding surface 17a has a width dimension W larger than a thickness dimension D of the polarization filter 2 held by the filter holding surface 17a. The difference between the width dimension W of the filter holding surface 17a and the thickness dimension D of the polarization filter 2 is 0.03 mm or less.

The rear annular wall portion 18 has a constant thickness dimension in the fore-and-aft direction X. The rear annular wall portion 18 functions as a rear stopper that restricts the movement of the polarization filter 2 that is held by the filter holding surface 17a to the rear X2.

The rear annular plate portion 19 inclines to the outer peripheral side toward the rear X2. More specifically, the front end of the outer peripheral surface of the rear annular plate portion 19 (portion adjacent to the rear annular wall portion 18) is provided with an annular groove 27, and the portion in which the annular groove 27 is formed is bent to the outer peripheral side so that the rear annular plate portion 19 inclines to the outer peripheral side. The rear portion of the outer peripheral surface of the rear annular plate portion 19 (portion adjacent to the annular projection portion 20) is provided with an annular notch 28. The notch 28 is shallower than the annular groove 27.

The annular projection portion 20 projects in a direction orthogonal to the rear annular plate portion 19. Consequently, the annular projection portion 20 extends to the front X1 toward the outer peripheral side. In the present embodiment, the annular projection portion 20 has a trapezoidal sectional shape tapering toward the tip. The inner peripheral portion of an annular protrusion 45 of the rear ring 5 is inserted into the annular recess 21 formed by the rear annular wall portion 18, the rear annular plate portion 19, and the annular projection portion 20.

(Front Stopper)

The front stopper 6 has a ring shape. The front stopper 6 has a height dimension in the radial direction R larger than a height dimension of the intermediate annular plate portion 17 of the front ring in the radial direction R (thickness of the intermediate annular plate portion 17). The front stopper 6 also includes an annular rear end surface 6a that is a flat surface orthogonal to the axis L. On the entire outer peripheral surface of the front stopper 6, an external thread 51 is formed that can be threadedly engaged with the internal thread 11 of the front ring 4. The external thread 51 of the front stopper 6 is threadedly engaged with the internal thread 11 of the front ring 4 to be screwed until the annular rear end surface 6a of the front stopper 6 abuts on the front end surface of the intermediate annular plate portion 17. In the state in which the front stopper 6 abuts on the intermediate annular plate portion 17, the inner peripheral end of the front stopper 6 projects to the inner peripheral side more than the filter holding surface 17a does. Consequently, the front stopper 6 can restrict the movement of the polarization filter 2 that is held by the filter holding surface 17a to the front X1.

(Rear Ring)

The front ring 4 includes a front annular plate portion (annular portion) 41 extending in the fore-and-aft direction X along the axis L, an annular wall portion 42 extending from the rear end of the front annular plate portion 41 toward the inner peripheral side in the radial direction R, and a rear annular plate portion 43 extending from the inner peripheral end of the annular wall portion 42 to the rear X2 along the axis L. The front annular plate portion 41 has a constant thickness dimension in the radial direction R. A grease holding recess 44 is formed on the front end surface of the annular wall portion 42. The grease holding recess 44 holds grease to slide the front ring 4 and the rear ring 5 smoothly. The external thread 12 serving as a rear mounting portion is formed on the outer peripheral surface of the rear annular plate portion 43.

The annular protrusion 45 that protrudes toward the inner peripheral side in the radial direction R is disposed on the front end of the inner peripheral surface of the rear annular plate portion 43. The annular protrusion 45 includes a rectangular sectional shape. The front end surface of the annular protrusion 45 is steplessly continuous to the front end surface of the annular wall portion 42. The annular protrusion 45 has a width dimension in the fore-and-aft direction X larger than the protrusion dimension to the inner peripheral side. The annular protrusion 45 is formed in a position partially overlapping the external thread 12 when seen from the radial direction R.

With the rear ring 5 holding the front ring 4, the front annular plate portion 41 is fitted into the annular step 25 of the front ring 4 in a frictionally movable manner. This structure allows the outer peripheral side 41a of the front annular plate portion 41 to be steplessly continuous to the outer peripheral side 15a of the front annular plate portion 15 of the front ring 4. The rear annular plate portion 43 abuts on the rear end of the intermediate annular plate portion 17 of the front ring 4 from the rear X2. The annular protrusion 45 abuts on the rear end of the rear annular wall portion 18 of the front ring 4 from the rear X2. The inner peripheral portion of the annular protrusion 45 is inserted into the annular recess 21 cut on the outer peripheral surface of the front stopper 6. This structure allows the rear ring 5 to hold the front ring 4 rotatably about the axis L.

(Assembly of Camera Filter Unit)

In order to assemble the camera filter unit 1A, the front ring 4 and the rear ring 5 are first combined with each other coaxially in the fore-and-aft direction X. The annular protrusion 45 of the rear ring 5 is then inserted into the annular recess 21 on the outer peripheral surface of the front ring 4. The assembling operation of inserting annular protrusion 45 of the rear ring 5 into the annular recess 21 on the outer peripheral surface of the front ring 4 is the same as that for the camera filter frame 10 according to the first embodiment. The description thereof will thus be omitted.

Thereafter, the polarization filter 2 is inserted into the front ring 4 from the front X1, causing the filter holding surface 17a to hold the polarization filter 2. The front stopper 6 is then screwed into the front ring 4 from the front X1, causing the annular rear end surface 6a of the front stopper 6 to abut on the intermediate annular plate portion 17 of the front ring 4. This completes the camera filter unit 1A. In the state in which the camera filter unit 1A is completed, the polarization filter 2 is held by the front ring 4 between the front stopper 6 and the rear annular wall portion 18 in a rotatable manner about the axis L.

An adhesive may be applied to the annular rear end surface 6a of the front stopper 6 or the front end surface of the intermediate annular plate portion 17 of the front ring 4 in advance to fix the front stopper 6 to the front ring 4 by the adhesive.

(Working Effect)

According to the present embodiment, the front ring 4 can rotate about the axis L using the annular protrusion 45 of the rear ring 5 that is inserted into the annular recess 21 as a guide. Consequently, no washer needs to be used to allow the rear ring 5 to hold the front ring 4 rotatably. In the case in which the front ring 4 is rotated using the annular protrusion 45 that is disposed in the rear ring 5 as a guide, the guide (annular protrusion 45) does not become distorted, nor does the position of the guide (annular protrusion 45) change. The annular protrusion 45 serving as a guide can be formed more accurately than a washer that expands and contracts in the radial direction, for example. Furthermore, because the present embodiment enables the annular projection portion 20 to be displaced accurately to the outer peripheral side, the accuracy of dimension between the annular protrusion 45 of the rear ring 5 and the annular recess 21 of the front ring 4 is high. In addition to this, because no member such as a washer is interposed between the front ring 4 and the rear ring 5, the front ring 4 and the rear ring 5 can be combined accurately. The front ring 4 held by the rear ring 5 can therefore be rotated smoothly.

Because the annular protrusion 45 of the rear ring 5 is disposed in a position overlapping the external thread 51 when seen from the radial direction R, the dimension of the camera filter frame 10A can be reduced in the fore-and-aft direction X compared with the case in which the annular protrusion 45 is formed in a position different from that of the mounting portion in the direction of the axis L.

Furthermore, the front ring 4 holds the polarization filter 2 rotatably about the axis L between the front stopper 6 and the rear annular wall portion 18. Consequently, stress (pressure) to be placed on the polarization filter 2 can be reduced compared with the case in which the polarization filter 2 is gripped by the front stopper 6 and the rear annular wall portion 18 (rear stopper) from the front and rear to be unrotatable, which can prevent distortion from occurring in the polarization filter 2.

As shown by the dotted lines in FIG. 4(b), in the intermediate annular plate portion 17 of the front ring 4, an adhesive injection hole 37 can be provided that passes through the intermediate annular plate portion in the direction intersecting the axis L to be open on the filter holding surface 17a. In the case in which the adhesive injection hole 37 is provided, the polarization filter 2 can be fixed to the front ring 4 by injecting an adhesive through the adhesive injection hole 37. The intermediate annular plate portion 17 is positioned on the inner peripheral side of the front annular plate portion 41 in the rear ring 5. Consequently, even in the case in which the adhesive injection hole 37 is formed in the intermediate annular plate portion 17, the adhesive injection hole 37 is not exposed to the outer peripheral side not to impair the appearance of the camera filter frame 10.

The width dimension W of the filter holding surface 17a can be the same as the thickness dimension D of the polarization filter 2, and a structure can also be employed in which the polarization filter 2 is gripped unrotatably between the front stopper 6 and the rear annular wall portion 18.

Third Embodiment

Figure 5A:
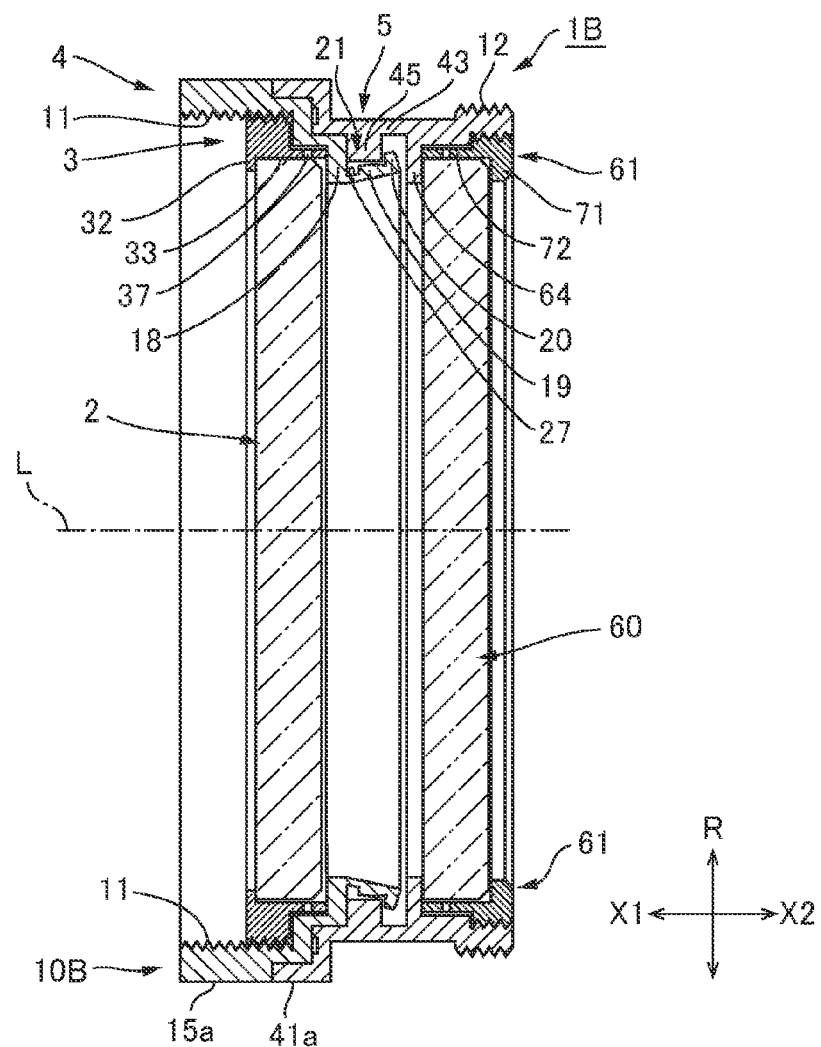
FIG. 5 includes a longitudinal sectional view and a partially enlarged sectional view of the camera filter unit according to a third embodiment.
Figure 5B:
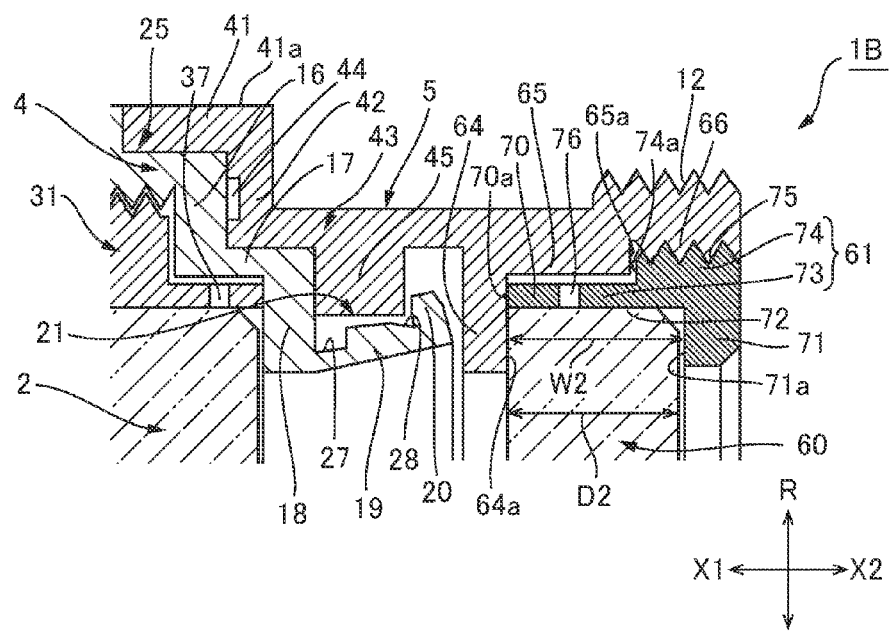

FIG. 5(a) is a longitudinal sectional view of a camera filter unit according to a third embodiment. FIG. 5(b) is a partially enlarged sectional view thereof. A camera filter unit 1B according to the present embodiment includes a disc-like polarization filter (optical element) 2, an inner ring 3 for holding the polarization filter 2 coaxially, a front ring 4 for holding the inner ring 3 coaxially from the outer peripheral side, and a rear ring 5 for holding the front ring 4 coaxially. The camera filter unit 1B according to the present embodiment also includes a disc-like second polarization filter (second optical element) 60, and a rear inner ring 61 that is inserted into the rear ring 5 from the rear to hold the second polarization filter 60 coaxially. The rear inner ring 61 is made of aluminum.

The front ring 4 holds the polarization filter 2 via the inner ring 3. The rear ring 5 holds the second polarization filter 60 via the rear inner ring 61. The rear ring 5 also holds the front ring 4 rotatably about the axis L. The inner ring 3, the front ring 4, the rear ring 5, and the rear inner ring 61 constitute a camera filter frame 10B.

In the camera filter unit 1B according to the present embodiment, a holding structure for the polarization filter 2 in which the front ring 4 holds the polarization filter 2 is the same as that in the camera filter unit 1 according to the first embodiment. A holding structure for the front ring 4 in which the rear ring 5 holds the front ring 4 rotatably about the axis L is also the same as those in the camera filter units 1 and 1A according to the first and the second embodiments, respectively. The following thus describes a holding structure in which the rear ring 5 holds the second polarization filter 60. The same reference numerals are given to components in common with those of the camera filter unit 1 according to the first embodiment and description thereof will be omitted. In the camera filter unit 1B according to the present embodiment, the holding structure for the polarization filter 2 in which the front ring 4 holds the polarization filter 2 is the same as the holding structure in the camera filter unit 1A according to the second embodiment.

As illustrated in FIG. 5, the rear ring 5 includes a second annular projection portion (a second annular projection portion and a second front stopper) 64 that projects to the inner peripheral side closer to the rear X2 than the front ring 4 does. The rear ring 5 also includes a thick portion 65 and an internal thread 66 to the rear side of the second annular projection portion 64. More specifically, a rear annular plate portion 43 of the rear ring 5 extends to the rear X2 longer than those in the camera filter units 1 and 1A according to the first and the second embodiments do, and includes the second annular projection portion 64, the thick portion 65, and the internal thread 66 on the inner peripheral surface thereof.

The second annular projection portion 64 projects toward the inner peripheral side in the radial direction R in a position that is separated from an annular protrusion 45 to the rear X2. The position of an annular projection portion 20 of the front ring 4 is between the annular protrusion 45 and the second annular projection portion 64 in the fore-and-aft direction X. The thick portion 65 extends from a midway position of the second annular projection portion 64 in the radial direction R to the rear X2 with a constant thickness. The second annular projection portion 64 includes a first annular rearward surface 64a on the outer peripheral side of the thick portion 65. The internal thread 66 is provided continuously to the rear X2 of the thick portion 65. The thick portion 65 includes a second annular rearward surface 65a between the thick portion 65 and the internal thread 66. An external thread 12 serving as a rear mounting portion is provided on the outer peripheral surface of the rear end of the rear ring 5 (outer peripheral surface of the rear end of the rear annular plate portion 43).

The rear inner ring 61 includes a rear annular frame 70 for holding the second polarization filter 60 coaxially from the outer peripheral side, and a second rear stopper (second rear stopper) 71 that projects from the rear edge of the rear annular frame 70 to the inner peripheral side to restrict the movement of the second polarization filter 60 to the rear X2. The second rear stopper 71 is abuttable from the rear X2 on the outer peripheral edge of the second polarization filter 60 that is held by the rear annular frame 70. The inner peripheral surface of the rear annular frame 70 is an annular surface that extends with a constant diameter dimension along the axis L, and is a rear filter holding surface 72 for holding the second polarization filter 60 coaxially.

The rear inner ring 61 includes a thin ring portion 73 and a thick ring portion 74 in this order from the front X1 toward the rear X2. The outer peripheral surface of the thick ring portion 74 is positioned closer to the outer peripheral side than the outer peripheral surface of the thin ring portion 73 is, and between these portions, an annular forward surface 74a is formed that extends along the radial direction R. On the outer peripheral surface of the thick ring portion 74, an external thread 75 is formed that can be threadedly engaged with the internal thread 66 of the rear ring 5. In the thin ring portion 73, a rear adhesive injection hole 76 is formed that passes through the thin ring portion in the radial direction R to be open on the rear filter holding surface 72. If an adhesive is injected from the outer peripheral side of the rear annular frame 70 through the rear adhesive injection hole 76 with the second polarization filter 60 held to the rear filter holding surface 72, the adhesive enables the second polarization filter 60 to be fixed to the rear inner ring 61. The number of rear adhesive injection holes 76 may be one, but a plurality of rear adhesive injection holes 76 are open on the thin ring portion 73 at equal angular intervals in the present embodiment. The rear adhesive injection hole 76 may also be omitted.

The second rear stopper 71 is an annular protrusion that protrudes from the rear edge of the rear annular frame 70 toward the inner peripheral side. The second rear stopper 71 includes an annular front end surface 71a that is a flat surface orthogonal to the axis L. The second rear stopper 71 has a width dimension from the annular front end surface 71a to a front end 70a of the rear annular frame 70 (width dimension of the rear filter holding surface 72) W2 larger than a thickness dimension D2 of the second polarization filter 60 held by the filter holding surface 33. The difference between the width dimension W2 of the rear filter holding surface 72 in the fore-and-aft direction X and the thickness dimension D2 of the second polarization filter 60 is 0.03 mm or less.

The rear inner ring 61 is inserted from the rear side into the rear ring 5 with the second polarization filter 60 held to the inner peripheral side of the rear annular frame 70. The external thread 75 of the rear inner ring 61 is then threadedly engaged with the internal thread 66 of the rear ring 5 to be screwed until the front end 70a of the rear annular frame 70 abuts on the second annular projection portion 64 (first annular rearward surface 64a) of the rear ring 5. When the front end 70a of the rear annular frame 70 abuts on the second annular projection portion 64, the annular forward surface 74a of the rear inner ring 61 faces the second annular rearward surface 65a of the rear ring 5 in the fore-and-aft direction X with a minute spacing allowed therebetween. The outer peripheral surface of the thin ring portion 73 of the rear annular frame 70 also faces the thick portion 65 of the rear ring 5 in the radial direction R with a minute spacing allowed therebetween.

With the front end 70a of the rear annular frame 70 abutting on the second annular projection portion 64, the distance (width dimension of the rear filter holding surface 72) W2 between the second rear stopper 71 and the second annular projection portion 64 is larger than the thickness dimension D2 of the second polarization filter 60. Consequently, the rear ring 5 holds the second polarization filter 60 rotatably about the axis L between the second rear stopper 71 and the second annular projection portion 64. Specifically, the second rear stopper 71 and the second annular projection portion 64 do not grip the second polarization filter 60 unrotatably. The second polarization filter 60 is fixed to the rear inner ring 61 unrotatably by the adhesive. The second annular projection portion 64 functions as a second front stopper that prevents the second polarization filter 60 from moving to the front X1.

When the front end 70a of the rear annular frame 70 abuts on the second annular projection portion 64 of the rear ring 5 by screwing the rear inner ring 61 into the rear ring 5, the annular forward surface 74a of the rear inner ring 61 may abut on the second annular rearward surface 65a of the rear ring 5.

(Working Effect)

Also in the present embodiment, the working effect similar to the camera filter units 1 and 1A according to the first and the second embodiments can be obtained. In the present embodiment, the second polarization filter 60 is also held to the rear ring 5. In the present embodiment, two optical filters (the polarization filter 2 and the second polarization filter 60) can thus be held in the camera filter frame 10B. Furthermore, the rear ring 5 holds the second polarization filter 60 rotatably about the axis L between the second rear stopper 71 and the second annular projection portion 64. Consequently, stress (pressure) to be placed on the second polarization filter 60 can be reduced compared with the case in which the second polarization filter 60 is gripped by the second rear stopper 71 and the second annular projection portion 64 from the front and rear to be unrotatable. Therefore, distortion can be prevented from occurring in the second polarization filter 60.

The rear adhesive injection hole 76 is formed in the rear inner ring 61 that is held on the inner peripheral side of the rear ring 5, which prevents the rear adhesive injection hole 76 from being exposed to the outer peripheral side not to impair the appearance of the camera filter frame 10B.

The width dimension W2 of the rear filter holding surface 72 can be the same as the thickness dimension D2 of the second polarization filter 60, and a structure can also be employed in which the second polarization filter 60 is gripped unrotatably between the second rear stopper 71 and the second annular projection portion 64.

The internal thread 66 of the rear ring 5 and the external thread 75 of the rear inner ring 61 may be omitted and the rear inner ring 61 may be fixed to the inner peripheral side of the rear ring 5 by the adhesive.

Furthermore, the optical elements held by the front ring 4 and the rear ring 5 are not limited to polarization filters. For example, a polarization filter can be held to the front ring 4 and a color filter can be held to the rear ring 5. Alternatively, for example, a cross filter can be held to the front ring 4 and a color filter can be held to the rear ring 5.

Fourth Embodiment

Figure 6A:
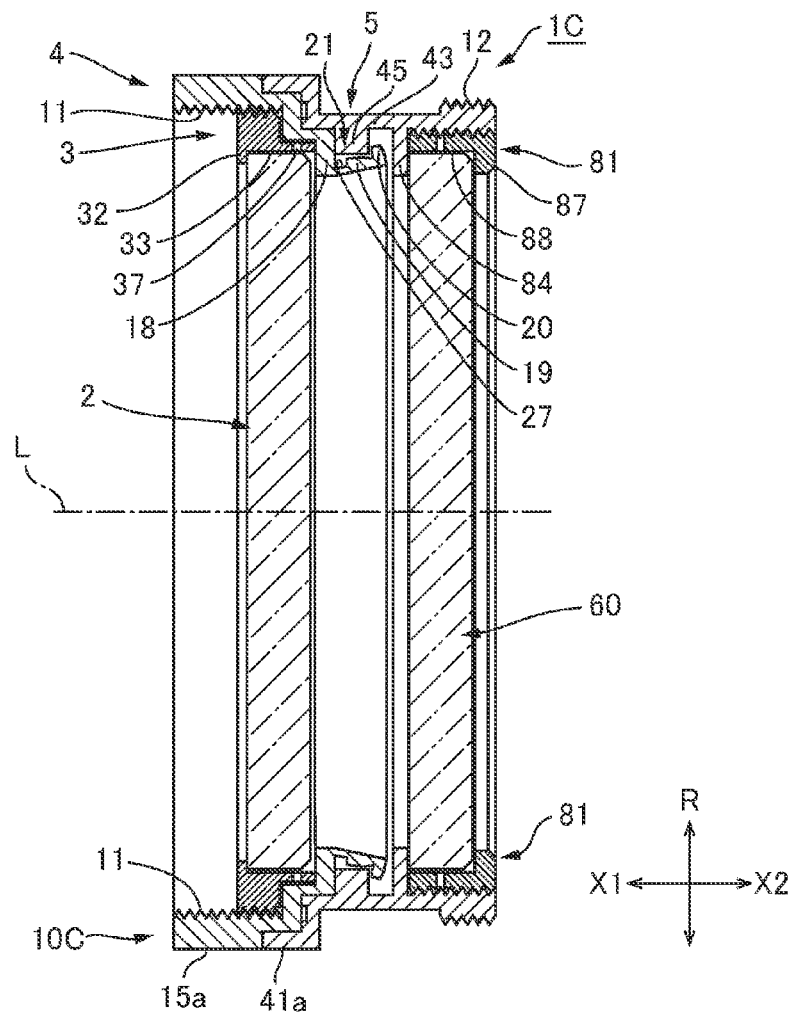
FIG. 6 includes a longitudinal sectional view and a partially enlarged sectional view of the camera filter unit according to a fourth embodiment.
Figure 6B:
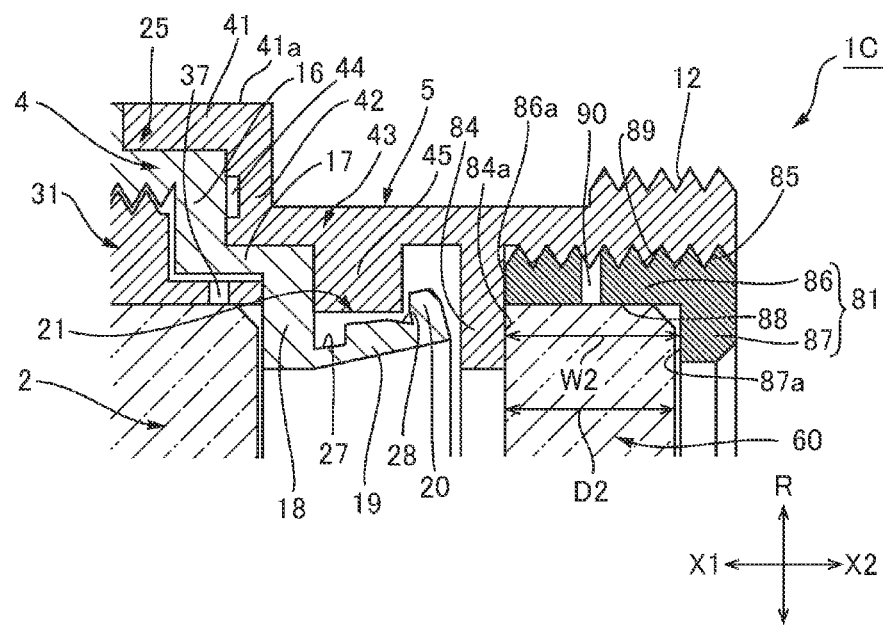

FIG. 6(a) is a longitudinal sectional view of a camera filter unit according to a fourth embodiment. FIG. 6(b) is a partially enlarged sectional view thereof. A camera filter unit 1C according to the present embodiment includes a disc-like polarization filter (optical element) 2, an inner ring 3 for holding the polarization filter 2 coaxially, a front ring 4 for holding the inner ring 3 coaxially from the outer peripheral side, and a rear ring 5 for holding the front ring 4 coaxially. The camera filter unit 1C according to the present embodiment also includes a disc-like second polarization filter (second optical element) 60, and a rear inner ring 81 that is inserted into the rear ring 5 from the rear X2 to hold the second polarization filter 60 coaxially. The rear inner ring 81 is made of aluminum.

The front ring 4 holds the polarization filter 2 via the inner ring 3. The rear ring 5 holds the second polarization filter 60 via the rear inner ring 81. The rear ring 5 also holds the front ring 4 rotatably about the axis L. The inner ring 3, the front ring 4, the rear ring 5, and the rear inner ring 81 constitute a camera filter frame 10C.

In the camera filter unit 1C according to the present embodiment, a holding structure for the polarization filter 2 in which the front ring 4 holds the polarization filter 2 is the same as that in the camera filter unit 1 according to the first embodiment. A holding structure for the front ring 4 in which the rear ring 5 holds the front ring 4 rotatably about the axis L is also the same as those in the camera filter units 1 and 1A according to the first and the second embodiments, respectively. The following thus describes a holding structure in which the rear ring 5 holds the second polarization filter 60. The same reference numerals are given to components in common with those of the camera filter unit 1 according to the first embodiment and description thereof will be omitted. In the camera filter unit 1C according to the present embodiment, the holding structure for the polarization filter 2 in which the front ring 4 holds the polarization filter 2 is the same as the holding structure in the camera filter unit 1A according to the second embodiment.

As illustrated in FIG. 6, the rear ring 5 includes a second annular projection portion (a second annular projection portion and a second front stopper) 84 that projects to the inner peripheral side closer to the rear X2 than the front ring 4 does. The rear ring 5 also includes an internal thread 85 to the rear side of the second annular projection portion 84. More specifically, a rear annular plate portion 43 of the rear ring 5 extends to the rear X2 longer than those in the camera filter units 1 and 1A according to the first and the second embodiments do, and includes the second annular projection portion 84 and the internal thread 85 on the inner peripheral surface thereof.

The second annular projection portion 84 projects toward the inner peripheral side in the radial direction R in a position that is separated from an annular protrusion 45 to the rear X2. The position of an annular projection portion 20 of the front ring 4 is between the annular protrusion 45 and the second annular projection portion 84 in the fore-and-aft direction X. The internal thread 85 is provided continuously to the rear X2 of the second annular projection portion 84. The second annular projection portion 84 includes an annular rearward surface 84a between the second annular projection portion 84 and the internal thread 85. An external thread 12 serving as a rear mounting portion is provided on the outer peripheral surface of the rear end of the rear ring 5 (outer peripheral surface of the rear end of the rear annular plate portion 43).

The rear inner ring 81 includes a rear annular frame 86 for holding the second polarization filter 60 coaxially from the outer peripheral side, and a second rear stopper (second rear stopper) 87 that projects from the rear edge of the rear annular frame 86 to the inner peripheral side to restrict the movement of the second polarization filter 60 to the rear X2. The second rear stopper 87 is abuttable from the rear X2 on the outer peripheral edge of the second polarization filter 60 that is held by the rear annular frame 86. The inner peripheral surface of the rear annular frame 86 is an annular surface that extends with a constant diameter dimension along the axis L, and is a rear filter holding surface 88 for holding the second polarization filter 60 coaxially. On the outer peripheral surface of the rear inner ring 81, an external thread 89 is formed that can be threadedly engaged with the internal thread 85 of the rear ring 5.

In the rear annular frame 86, a rear adhesive injection hole 90 is formed that passes through the rear annular frame in the radial direction R to be open on the rear filter holding surface 88. If an adhesive is injected from the outer peripheral side of the rear annular frame 86 through the rear adhesive injection hole 90 with the second polarization filter 60 held to the rear filter holding surface 88, the adhesive enables the second polarization filter 60 to be fixed to the rear inner ring 81. The number of rear adhesive injection holes 90 may be one, but a plurality of rear adhesive injection holes 90 are open on the thin ring portion 73 at equal angular intervals in the present embodiment. The rear adhesive injection hole 90 may also be omitted.

The second rear stopper 87 is an annular protrusion that protrudes from the rear edge of the rear annular frame 86 toward the inner peripheral side. The second rear stopper 87 includes an annular front end surface 87a that is a flat surface orthogonal to the axis L. The second rear stopper 87 has a width dimension from the annular front end surface 87a to a front end 86a of the rear annular frame 86 (width dimension of the rear filter holding surface 88) W2 larger than a thickness dimension D2 of the second polarization filter 60 held by the filter holding surface 33. The difference between the width dimension W2 of the rear filter holding surface 88 in the fore-and-aft direction X and the thickness dimension D2 of the second polarization filter 60 is 0.03 mm or less.

The rear inner ring 81 is inserted from the rear side into the rear ring 5 with the second polarization filter 60 held to the inner peripheral side of the rear annular frame 86. The external thread 89 of the rear inner ring 81 is then threadedly engaged with the internal thread 85 of the rear ring 5 to be screwed until the front end 86a of the rear annular frame 86 abuts on the second annular projection portion 84 (annular rearward surface 84a) of the rear ring 5.

With the front end 86a of the rear annular frame 86 abutting on the second annular projection portion 84, the distance (width dimension of the rear filter holding surface 95) W2 between the second rear stopper 87 and the second annular projection portion 84 is larger than the thickness dimension D2 of the second polarization filter 60. Consequently, the rear ring 5 holds the second polarization filter 60 rotatably about the axis L between the second rear stopper 87 and the second annular projection portion 84. Specifically, the second rear stopper 87 and the second annular projection portion 84 do not grip the second polarization filter 60 unrotatably. The second polarization filter 60 is fixed to the rear inner ring 81 unrotatably by the adhesive. The second annular projection portion 84 functions as a second front stopper that prevents the second polarization filter 60 from moving to the front X1.

(Working Effect)

Also in the present embodiment, the working effect similar to the camera filter units 1 and 1A according to the first and the second embodiments can be obtained. In the present embodiment, the second polarization filter 60 is also held to the rear ring 5. Specifically, two optical filters can be held in the camera filter frame 10C in the present embodiment. Furthermore, the rear ring 5 holds the second polarization filter 60 rotatably about the axis L between the second rear stopper 87 and the second annular projection portion 84. Consequently, stress (pressure) to be placed on the second polarization filter 60 can be reduced compared with the case in which the second polarization filter 60 is gripped by the second rear stopper 87 and the second annular projection portion 84 from the front and rear to be unrotatable. Therefore, distortion can be prevented from occurring in the second polarization filter 60.

The rear adhesive injection hole 90 is formed in the rear inner ring 81 that is held on the inner peripheral side of the rear ring 5, which prevents the rear adhesive injection hole 90 from being exposed to the outer peripheral side not to impair the appearance of the camera filter frame 10C.

The width dimension W2 of the rear filter holding surface 88 can be the same as the thickness dimension D2 of the second polarization filter 60, and a structure can also be employed in which the second polarization filter 60 is gripped unrotatably between the second rear stopper 87 and the second annular projection portion 84. The rear inner ring 81 may be fixed to the inner peripheral side of the rear ring 5 by the adhesive. Furthermore, the optical elements held by the front ring 4 and the rear ring 5 are not limited to polarization filters.

Fifth Embodiment

Figure 7A:
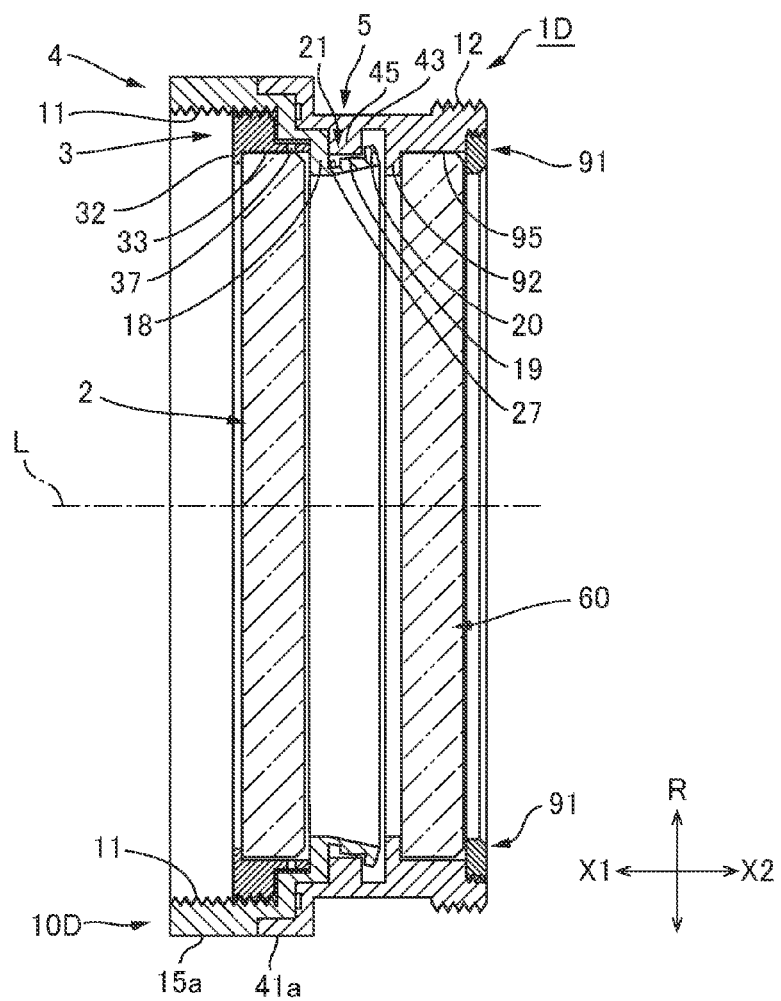
FIG. 7 includes a longitudinal sectional view and a partially enlarged sectional view of the camera filter unit according to a fifth embodiment.

FIG. 7(a) is a longitudinal sectional view of a camera filter unit according to a fifth embodiment. FIG. 5(b) is a partially enlarged sectional view thereof. A camera filter unit 1D according to the present embodiment includes a disc-like polarization filter (optical element) 2, an inner ring 3 for holding the polarization filter 2 coaxially, a front ring 4 for holding the inner ring 3 coaxially from the outer peripheral side, and a rear ring 5 for holding the front ring 4 coaxially. The camera filter unit 1D according to the present embodiment also includes a disc-like second polarization filter (second optical element) 60, and a second rear stopper 91 that is inserted into the rear ring 5 from the rear X2 to restrict the movement of the second polarization filter 60 to the rear X2. The second rear stopper 91 is made of aluminum.

The front ring 4 holds the polarization filter 2 via the inner ring 3. The rear ring 5 holds the second polarization filter 60. The rear ring 5 also holds the front ring 4 rotatably about the axis L. The inner ring 3, the front ring 4, the rear ring 5, and the second rear stopper 91 constitute a camera filter frame 10D.

In the camera filter unit 1D according to the present embodiment, a holding structure for the polarization filter 2 in which the front ring 4 holds the polarization filter 2 is the same as that in the camera filter unit 1 according to the first embodiment. A holding structure for the front ring 4 in which the rear ring 5 holds the front ring 4 rotatably about the axis L is also the same as those in the camera filter units 1 and 1A according to the first and the second embodiments, respectively. The following thus describes a holding structure in which the rear ring 5 holds the second polarization filter 60. The same reference numerals are given to components in common with those of the camera filter unit 1 according to the first embodiment and description thereof will be omitted. In the camera filter unit 1D according to the present embodiment, the holding structure for the polarization filter 2 in which the front ring 4 holds the polarization filter 2 is the same as the holding structure in the camera filter unit 1A according to the second embodiment.

Figure 7B:
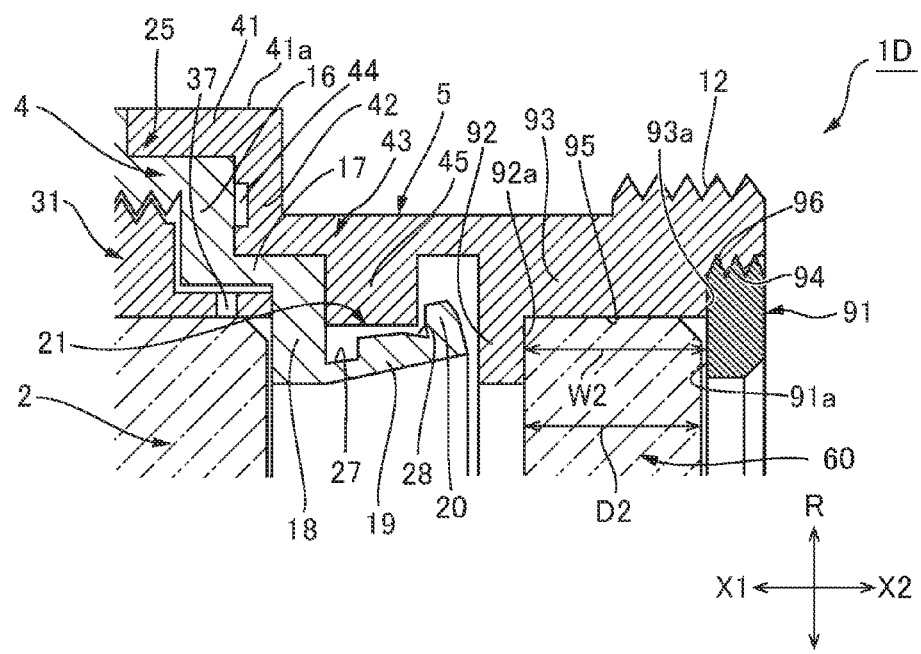

As illustrated in FIG. 7, the rear ring 5 includes a second annular projection portion (a second annular projection portion and a second front stopper) 92 that projects to the inner peripheral side closer to the rear X2 than the front ring 4 does. The rear ring 5 also includes a thick portion 93 and an internal thread 94 to the rear side of the second annular projection portion 92. More specifically, a rear annular plate portion 43 of the rear ring 5 extends to the rear X2 longer than those in the camera filter units 1 and 1A according to the first and the second embodiments do, and includes the second annular projection portion 92, the thick portion 93, and the internal thread 94 on the inner peripheral surface thereof.

The second annular projection portion 92 projects toward the inner peripheral side in the radial direction R in a position that is separated from an annular protrusion 45 to the rear X2. The position of an annular projection portion 20 of the front ring 4 is between the annular protrusion 45 and the second annular projection portion 92 in the fore-and-aft direction X. The thick portion 93 extends from a midway position of the second annular projection portion 92 in the radial direction R to the rear X2 with a constant thickness. The second annular projection portion 92 includes a first annular rearward surface 92a on the outer peripheral side of the thick portion 93.

The thick portion 93 is a rear holding portion for holding the second polarization filter 60 coaxially from the outer peripheral side. Specifically, the inner peripheral surface of the thick portion 93 is an annular surface that extends with a constant diameter dimension along the axis L, and is a rear filter holding surface 95 for holding the second polarization filter 60 coaxially. The rear filter holding surface 95 has a width dimension W2 larger than a thickness dimension D2 of the second polarization filter 60 held by the rear filter holding surface 95. The difference between the width dimension W2 of the rear filter holding surface 95 and the thickness dimension D2 of the second polarization filter 60 is 0.03 mm or less.

The internal thread 94 is provided continuously to the rear X2 of the thick portion 93. The thick portion 93 includes a second annular rearward surface 93a between the thick portion 93 and the internal thread 94. An external thread 12 serving as a rear mounting portion is provided on the outer peripheral surface of the rear end of the rear ring 5 (outer peripheral surface of the rear end of the rear annular plate portion 43).

The second rear stopper 91 has a ring shape. The second rear stopper 91 has a height dimension in the radial direction R larger than a height dimension of the thick portion 93 of the rear ring 5 in the radial direction R (thickness of the thick portion 93). The second rear stopper 91 also includes an annular front end surface 91a that is a flat surface orthogonal to the axis L. On the entire outer peripheral surface of the second rear stopper 91, an external thread 96 is formed that can be threadedly engaged with the internal thread 94 of the rear ring 5. The external thread 96 of the second rear stopper 91 is threadedly engaged with the internal thread 94 of the rear ring 5 to be screwed until the annular front end surface 91a of the second rear stopper 91 abuts on the second annular rearward surface 93a of the thick portion 93. In the state in which the second rear stopper 91 abuts on the thick portion 93, the inner peripheral end of the second rear stopper 91 projects to the inner peripheral side more than the rear filter holding surface 95 does. Consequently, the second rear stopper 91 can restrict the movement of the second polarization filter 60 that is held by the rear filter holding surface 95 to the rear X2.

In order for the rear ring 5 to hold the second polarization filter 60, the second polarization filter 60 is first inserted into the rear ring 5 from the rear X2 to cause the rear filter holding surface 95 to hold the second polarization filter 60. The second rear stopper 91 is then screwed into the rear ring 5 from the rear X2 to cause the annular front end surface 91a of the second rear stopper 91 to abut on the second annular rearward surface 93a of the thick portion 93. This completes the camera filter unit 1D. In the state in which the camera filter unit 1D is completed, the second polarization filter 60 is held by the rear ring 5 between the second rear stopper 91 and the second annular projection portion 92 in a rotatable manner about the axis L. The second annular projection portion 92 functions as a second front stopper that prevents the second polarization filter 60 from moving to the front X1.

(Working Effect)

Also in the present embodiment, the working effect similar to the camera filter units 1 and 1A according to the first and the second embodiments can be obtained. In the present embodiment, the second polarization filter 60 is also held to the rear ring 5. Specifically, two optical filters can be held in the camera filter frame 10C in the present embodiment. Furthermore, the rear ring 5 holds the second polarization filter 60 rotatably about the axis L between the second rear stopper 91 and the second annular projection portion 92. Consequently, stress (pressure) to be placed on the second polarization filter 60 can be reduced compared with the case in which the second polarization filter 60 is gripped by the second rear stopper 91 and the second annular projection portion 92 from the front and rear to be unrotatable. Therefore, distortion can be prevented from occurring in the second polarization filter 60.

The width dimension W2 of the rear filter holding surface 95 can be the same as the thickness dimension D2 of the second polarization filter 60, and a structure can also be employed in which the second polarization filter 60 is gripped unrotatably between the second rear stopper 91 and the second annular projection portion 92. The second rear stopper 91 may be fixed to the inner peripheral side of the rear ring 5 by the adhesive. Furthermore, the optical elements held by the front ring 4 and the rear ring 5 are not limited to polarization filters.

OTHER EMBODIMENTS

Although the annular groove 27 is cut on the outer peripheral surface of the rear annular plate portion 19 of the front ring 4 in the above embodiment, an annular groove may be cut on the inner peripheral surface of the rear annular plate portion 19, and the rear annular plate portion 19 may be bent from the position in which the annular groove is formed to the outer peripheral side. Alternatively, annular grooves may be cut in respective positions on the inner peripheral surface and the outer peripheral surface of the rear annular plate portion 19 overlapping with each other when seen from the radial direction R, and the rear annular plate portion 19 may be bent from the positions in which the annular grooves are formed to the outer peripheral side. Furthermore, the annular groove 27 and the notch 28 may be omitted.

A cross filter can also be held to the front ring 4 as an optical element. Furthermore, a color filter may be held to the front ring 4 and a polarization filter or a cross filter may be held to the rear ring 5. Alternatively, a color filter may be held to each of the front ring 4 and the rear ring 5.

The invention claimed is:

1. A camera filter frame comprising:
   a front ring that holds an optical element on an inner peripheral side thereof and includes an annular recess on an outer peripheral surface thereof; and
   a rear ring that includes, on an inner peripheral surface thereof, an annular protrusion inserted into the annular recess and that holds the front ring rotatably, wherein
   the front ring includes an annular wall portion extending in a radial direction, an annular plate portion extending rearward from an inner peripheral end of the annular wall portion, and an annular projection portion projecting for a shorter distance than the annular wall portion from a rear end of the annular plate portion toward an outer peripheral side,
   the annular recess is formed by the annular wall portion, the annular plate portion, and the annular projection portion, and
   a position of the annular protrusion is between the annular wall portion and the annular projection portion in a fore-and-aft direction and the annular plate portion is bent to the outer peripheral side to displace the annular projection portion to the outer peripheral side and a state in which the annular protrusion is inserted into the annular recess is created.

2. The camera filter frame according to claim 1, wherein
   the annular plate portion includes an annular groove on at least one of an inner peripheral surface and an outer peripheral surface thereof, and
   a portion in which the annular groove is formed in the annular plate portion is bent to displace the annular projection portion to the outer peripheral side.

3. The camera filter frame according to claim 1, further comprising:
   a front stopper that restricts a forward movement of the optical element; and
   a rear stopper that restricts a rearward movement of the optical element, wherein
   the front ring includes a holding portion for holding the optical element in a position closer to a front side than a position of the annular wall portion is,
   the front stopper is attached to an inner peripheral surface of the front ring, and
   the rear stopper is the annular wall portion.

4. The camera filter frame according to claim 3, wherein the front ring holds the optical element between the front stopper and the rear stopper in a rotatable manner about an axis.

5. The camera filter frame according to claim 3, wherein
   the rear ring includes an annular portion positioned on an outer peripheral side of the holding portion closer to a front side than the annular protrusion is, and
   the holding portion includes an adhesive injection hole passing therethrough in a direction intersecting an axis of the holding portion.

6. The camera filter frame according to claim 1, further comprising:
   an inner ring that is inserted into the front ring; and
   a rear stopper that restricts a rearward movement of the optical element, wherein
   the inner ring includes an annular frame for holding the optical element from an outer peripheral side, and a front stopper that protrudes from a front edge of the annular frame to an inner peripheral side to restrict a forward movement of the optical element,
   the front ring holds the inner ring in a position closer to a front side than a position of the annular wall portion is, and
   the rear stopper is the annular wall portion.

7. The camera filter frame according to claim 6, wherein the front ring holds the optical element between the front stopper and the rear stopper in a rotatable manner about an axis.

8. The camera filter frame according to claim 6, wherein the annular frame is provided with an adhesive injection hole passing therethrough in a direction intersecting an axis of the annular frame.

9. The camera filter frame according to claim 1, wherein
   the rear ring includes an external thread in a rear end of an outer peripheral surface thereof, and
   the annular protrusion is disposed in a position overlapping the external thread when seen from a radial direction.

10. The camera filter frame according to claim 1, wherein the rear ring holds a second optical element on an inner peripheral side thereof.

11. The camera filter frame according to claim 10, further comprising:
    a second front stopper that restricts a forward movement of the second optical element; and
    a second rear stopper that restricts a rearward movement of the second optical element, wherein
    the rear ring includes a second annular projection portion that projects to an inner peripheral side at a rear of the front ring, and a rear holding portion for holding the second optical element at a rear of the second annular projection portion,
    the second front stopper is the second annular projection portion, and
    the second rear stopper is attached to an inner peripheral surface of the rear ring.

12. The camera filter frame according to claim 11, wherein the rear ring holds the second optical element between the second front stopper and the second rear stopper in a rotatable manner about an axis.

13. The camera filter frame according to claim 10, further comprising:

a rear inner ring that is inserted into the rear ring; and a second front stopper that restricts a forward movement of the second optical element, wherein the rear ring includes a second annular projection portion that projects to an inner peripheral side at a rear of the front ring, the rear inner ring includes a rear annular frame that is positioned at a rear of the second annular projection portion and that holds the second optical element from an outer peripheral side, and a second rear stopper that projects from the rear annular frame to an inner peripheral side to restrict a rearward movement of the second optical element, and the second front stopper is the second annular projection portion.

14. The camera filter frame according to claim 13, wherein the rear ring holds the second optical element between the second front stopper and the second rear stopper in a rotatable manner about an axis.

15. A camera filter unit comprising:

the camera filter frame as claimed in claim 1; and a polarization filter held by the front ring as the optical element.

* * * * *